United States Patent [19]

Carney

[11] Patent Number: 4,507,022
[45] Date of Patent: Mar. 26, 1985

[54] METHOD AND APPARATUS FOR TRANSPORTING SLURRY ALONG A PIPELINE

[75] Inventor: John C. Carney, San Francisco, Calif.

[73] Assignee: Bechtel International Corporation, San Francisco, Calif.

[21] Appl. No.: 370,220

[22] Filed: Apr. 20, 1982

[51] Int. Cl.³ .............................................. B65G 53/30
[52] U.S. Cl. ..................... 406/50; 406/155; 406/197
[58] Field of Search ............... 406/47, 50, 155, 156, 406/197

[56] References Cited

U.S. PATENT DOCUMENTS

| | | | |
|---|---|---|---|
| 2,672,370 | 3/1954 | Jones et al. | 406/50 |
| 2,920,923 | 1/1960 | Wasp et al. | 406/197 |
| 3,690,732 | 9/1972 | Wasp | 406/50 |
| 4,019,783 | 4/1977 | Kayser | 406/195 |

FOREIGN PATENT DOCUMENTS 57-13026  1/1982  Japan .................. 406/197

Primary Examiner—Jeffrey V. Nase
Assistant Examiner—Jon M. Rastello
Attorney, Agent, or Firm—Townsend and Townsend

[57] ABSTRACT

Method and apparatus for transporting a slurry along a pipeline having a number of downstream delivery points along its length and a plant at each delivery point for burning or otherwise using a part of the solids, such as coal, obtained from the slurry. In the practice of the method, the pipeline is filled with a carrier fluid, such as water, and batches of slurry are introduced between batches of the carrier fluid for movement along the pipeline. Each batch of slurry is separated from the batches of carrier fluid by a cap and a tail, the cap and tail being formed from a liquid suspension of fine solids. At each downstream delivery point, each batch of slurry and its cap and tail are directed out of the pipeline into a holding tank. A portion of the contents of the holding tank is removed from the holding tank and dewatered to produce a large mesh solids cake and a centrate defined as a liquid suspension of fines. The remainder of the contents of the holding tank and a cap and tail formed from the centrate is then directed into the pipeline downstream of the delivery point between the batches of carrier fluid for transit to the next delivery point along the pipeline. The foregoing steps are repeated at each successive downstream delivery point along the pipeline. At each delivery point, the cake formed by dewatering is burned or otherwise used at a plant at the delivery point. At the last delivery point, the remaining slurry is dewatered and used. the invention eliminates the need for grinding solids at each downstream delivery point to form the caps and tails material needed to isolate the batches of slurry from the carrier fluid sent on to the next delivery point.

24 Claims, 5 Drawing Figures

METHOD AND APPARATUS FOR TRANSPORTING SLURRY ALONG A PIPELINE

This invention relates to improving the methods used for transporting slurries along a pipeline and, more particularly, to a method and apparatus for moving spaced batches of a slurry along a pipeline having a number of delivery points at which the solids are used.

BACKGROUND OF THE INVENTION

In the operation of a commercial coal slurry transportation pipeline, plugging or blocking of the pipeline due to the build-up of coal particles in the interface between the coal slurry and a carrier fluid, such as water, has been avoided by the use of a pseudo fluid immediately in advance of and immediately behind the batches of coal slurry being transported through the pipeline by the carrier fluid. The formation and use of this pseudo fluid has been described in U.S. Pat. No. 2,920,923. Such pseudo fluid is comprised of a suspension of coal fines or particles of small size (in the range of 90 to 100% of the solids passing a 325 mesh Tyler standard screen). This pseudo fluid possesses the properties of a fluid having a greater density and/or viscosity than the slurry. The pseudo fluid at the front of a batch of coal slurry is called a cap. The pseudo fluid at the rear of the batch of coal slurry is called a tail.

The purpose of the cap and tail pseudo fluid is to exert a suspending force on the relatively coarse coal particles in the interface between the coal slurry batch and carrier fluid if the cap and tail were not present. This suspending force supplied by the caps and tails is equal to or greater than the suspending force exerted by the slurry by itself on such course coal particles.

U.S. Pat. No. 3,690,732 is also pertinent to the making of a cap from a coal slurry batch for the foregoing purpose. This patent discloses the way in which a cap can be created from the slurry itself to facilitate the pumping of the slurry and decreases the overall cost of operation of the slurry pipeline.

In the operation of certain commercial coal slurry pipelines, such as a 1500-mile coal slurry pipeline, from Wyoming to Arkansas, it is proposed that the pipeline will pass near locations at which coal-using plants are located. It is desirable, therefore, to use the pipeline to supply a portion of the coal slurry being used by each of these plants, whereby a single pipeline will provide the source of fuel for a number of plants at different locations.

In the first few years of pipeline system operations, the quantity of coal which will be transported through the pipeline generally will not be sufficient to keep the pipeline full of coal slurry at all times. Accordingly, coal will be transported as a slurry in batches, and the batches of coal slurry will be spaced apart by batches of a carrier fluid, such as water. To avoid the plugging of the pipeline as mentioned in U.S. Pat. No. 2,920,923, caps and tails must be provided at the front and rear ends of all of the batches of coal slurry in the pipeline.

U.S. Pat. No. 2,920,923 discloses that the pseudo fluid defining a cap and a tail is formed by grinding coal into fines or fine particles at the entry point of the pipeline. Each batch of coal slurry as pumped into the pipeline has a cap and a tail of fine coal slurry added to the batch. However, this patent does not teach or suggest that the pseudo fluid formed at the entrance station can be re-used as caps and tails at the downstream delivery points along the pipeline if the batch of coal slurry is removed from the pipeline for any reason.

Where a single pipeline is to furnish coal in batches to several plants along the pipeline, it may be necessary that all of the coal slurry be removed from the pipeline at each coal delivery point to obtain stable pipeline operation and balance different flow rates in each section of the pipe-line. The portion of the slurry required at the delivery point will be dewatered to form a coal cake for use at the corresponding plant. This creates the problem of forming the cap and tail required for the remaining portions of the coal slurry batches when the remaining coal slurry batches are returned to the pipeline for movement to the next downstream delivery point. Because of this problem, a need has arisen for improvements in the method for producing caps and tails material at each of the downstream delivery points where coal is removed from the pipeline. This invention will permit the movement of a coal slurry batches with caps and tails requirements at each delivery point as now would be done using existing art.

SUMMARY OF THE INVENTION

The present invention provides a solution to the problem referred to above by providing a method and apparatus for forming cap and tail material from slurry batch removed from the pipeline at each downstream delivery point the delivery point. For convenience, the slurry will hereinafter be referred to as a coal slurry although other slurries can be used, such as slurries made from iron ore, magnetite, sand and the like. Removal of the coal slurry batch from a pipeline not only allows a part of the batch to be dewatered and used at a plant at the delivery point, but also permits the formation of cap and tail material during the dewatering of the coal and avoids the need for grinding the coal at each donwstream delivery point to make caps and tails. This will reduce the equipment and labor costs involved in operating the pipeline without sacrificing the safety of transporting a coal slurry further along the pipeline without caps and tails for each slurry batch.

The method of the present invention includes directing the coal slurry and its cap and tail into a holding tank at each downstream delivery point along a pipeline. The cap and tail requirements for the coal slurry batch entering the pipeline at the entry point will have been produced by grinding coal at that entry point. A part of the slurry mixture in the holding tank at each downstream delivery plant, such as from 10 to 80% by volume, is removed from the holding tank at that location and dewatered to produce the required amount of large mesh coal cake and the remaining stream or centrate which is a mixture of water and coal fines. This centrate or pseudo fluid in which the fines are suspended in water can be used for caps and tails with processing material. The remainder of the slurried coal in the holding tank at each delivery point is not dewatered.

The centrate is thickened by additional dewatering and it then can be used as a cap and a tail material for the coal slurry batch not dewatered. The coal slurry batch not taken from the holding tank at this delivery point is returned to the pipeline for transit to the next downstream delivery point as a coal slurry batch using the centrate material as a cap and a tail. At each of the remaining downstream delivery points, the foregoing steps are repeated and finally, at the last delivery point, the solids will be dewatered from centrate and will be used. The present invention therefore satisfies the need for caps and tails in batch coal slurry pipelining without having to grind coal to form caps and tails material at the various delivery points aling the pipeline.

The primary object of the present invention is, therefore, to provide a method and apparatus for transporting a coal slurry along a pipeline having a coal-using plants at a number of downstream delivery points along the pipeline wherein the coal slurry is transported in the form of a batch between batches of a carrier fluid and in which a cap and a tail of a pseudo fluid are placed between the ends of the coal slurry batch and respective batches of carrier fluid so that, when a coal slurry batch is removed from the pipeline and a portion of the coal slurry batch is dewatered to form a coal cake for use at the coal-using plant, a stream of coal fines is also formed by the dewatering step and these coal fines can be used as a cap and tail material when the remainder of the coal slurry batch is returned to the pipeline for movement to the next downstream delivery point.

Other objects of this invention will become apparent as the following specification progresses, reference being had to the accompanying drawing for an illustration of the invention.

In the Drawing:

FIG. 1 is a block diagram of a coal slurry pipeline having a number of spaced delivery points along its length;

FIG. 2 is a block diagram of one of the delivery points showing a holding tank for receiving a batch of coal slurry removed from the pipeline, equipment for dewatering a portion of the coal slurry from the holding tank to feed a using plant at the delivery point, and a tank to hold cap and tail material for insertion into the pipeline as the contents of the holding tank are returned to the pipeline for transit to the next station;

Figure 1:
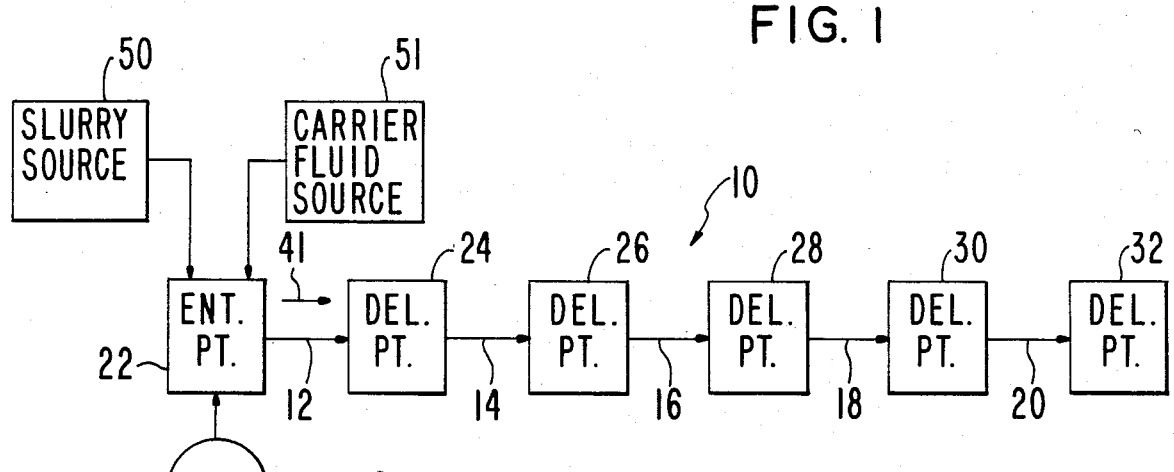

The pipeline of the present invention is broadly denoted by the numeral 10 and is illustrated in block form in FIG. 1. Pipeline 10 has a number of tubular segments 12, 14, 16, 18 and 20 which connect an entry point 22 with a number of downstream delivery points 24, 26, 28, 30 and 32. A representative pipeline to which the teachings of the present invention can be applied is a proposed 1500-mile coal slurry pipeline in which coal is delivered to approximately ten power plants at five downstream delivery points along the pipeline.

Figure 3:
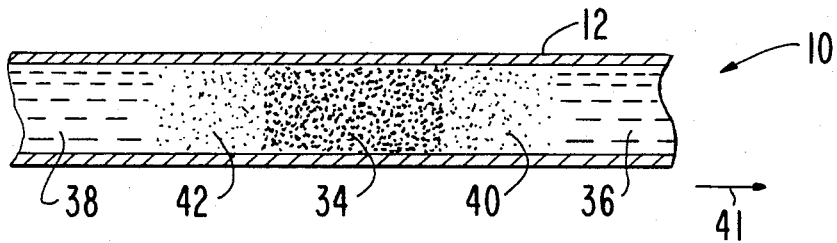
FIG. 3 is an enlarged, cross-sectional view of a pipeline showing a cap and a tail on opposed ends of a batch of coal slurry.

Pipeline 10 is used to transport spaced batches of coal slurry from station 22 to the various downstream delivery points. Each coal slurry batch, denoted by the numeral 34 (FIG. 3), is located between carrier fluid batches 36 and 38, such as water, is moved in the direction of arrow 41 to the next downstream delivery point. To separate slurry 34 from carrier fluid batches 36 and 38, a cap 40 and a tail 42 are placed ahead and behind, respectively, of the slurry batch 34. Cap 40 and tail 42 are formed from a pseudo fluid of the type described in U.S. Pat. No. 2,920,923.

Typically, the length of coal slurry batch 34 in the pipeline is greater than the lengths of cap 40 and tail 42. For example, the length of coal slurry batch 34 is 3 to 100 miles; the length of each of cap 40 and tail 42 is 0.5 to 6 miles; and the length of water carrier fluid batches 36 and 38 is 25 to 30 miles or more.

Figure 2:
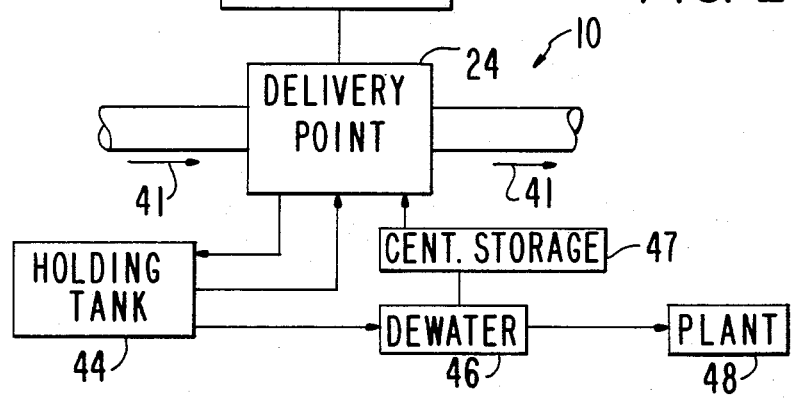

At each downstream delivery point, a holding tank 44 (FIG. 2) is provided to receive the batch of coal slurry and its cap and tail after arrival of them at the delivery point. A portion of the coal slurry batch 34, the cap 40 and the tail 42 (as mixed together in the holding tank) is removed from the holding tank and directed to dewatering equipment 46, such as a centrifuge, where a major portion of the coal slurry, such as 90%, is dewatered to form large mesh coal cake which is then directed to a plant 48, such as a power plant. The remaining portion of the coal slurry, such as 10%, is removed from the dewatering equipment 46 as a stream of coal fines in water, which is called a centrate, and is placed in a storage tank 47. The centrate can be thickened by additional dewatering so that the centrate is then useable as the cap and tail material as required for the downstream transport of coal slurry batches.

In the operation of pipeline 10, a coal slurry source 50 (FIG. 1) and a carrier fluid source 51 are provided adjacent to the entry point 22. Also, a grinding facility 53 will be provided adjacent to entry point 22 to grind coal particles with the carrier fluid into coal fines slurry to form the pseudo fluid. Parenthetically, the pseudo fluid can be made either from the material forming the slurry batches or any other suitable solids. Normally, the pseudo fluid used for caps and tails will be made of the same material as the main batch of slurry.

To transport a batch of coal slurry from source 50 along the pipeline, first a batch 36 (FIG. 3) of carrier fluid is directed into the pipeline at entry point 22 for flow through segment 12 (FIG. 1) to the first downstream delivery point 24 (FIG. 1). Following this batch 36 of carrier fluid, a cap 40 containing fines from grinding facility 53 is directed into segment 12. Following this, coal slurry batch 34 is directed into segment 12 immediately behind cap 40. When this is completed, a tail 42 is pumped into segment 12 behind the coal slurry batch 34. A batch 38 of carrier fluid is then pumped into segment 12 and follows the tail 42. Carrier fluid batch 38 is followed by a cap, a coal slurry batch, a tail and so forth until all of the batches of coal slurry required to be sent from entry point 22 along the pipeline have been transported to delivery point 24.

At each downstream station, such as station 24 (FIG. 2), batches 36 and 38 of carrier fluid are either directed into a carrier fluid tank 55 or is dumped or sold for some other use. Cap 40, coal slurry batch 34 and tail 42 is directed as a mixture into holding tank 44 at the delivery point. Normally, each coal slurry batch and its cap and tail as they flow through the pipeline is interrupted at each delivery point. From the holding tank 44, a portion of the mixture of the coal slurry, the cap and the tail is removed from the holding tank and dewatered to produce approximately 90% large mesh coal cake and a remaining stream containing approximately 10% of the solids present as fines or centrate. The coal cake is used at plant 48 at the delivery point, and the centrate is stored in tank 47 to be available for use as the cap and tail for the coal slurry content still remaining in tank 44.

The next series of steps include a substantial repetition of the steps performed at entry point 22, namely the steps of directing into a pipeline segment 14 (FIG. 1) a batch 36 (FIG. 3) of carrier fluid from holding tank 55, a cap 40 from the centrate in tank 47 at delivery point 24, a coal slurry batch 34 from the holding tank 44 at delivery point 24, a tail 42 from the centrate in tank 47 at delivery point 24, and a batch 38 of carrier fluid from holding tank 55. These are directed successively into segment 14 for flow to the next downstream delivery point 26. At delivery point 26, the batches 36 and 38 of carrier fluid are put into carrier fluid tank 55 or dumped and sold while coal slurry batch 34 and cap and tail 40 and 42 are directed as a mixture into a holding tank 44 at delivery point 26 from which a portion is removed for dewatering to form the coal cake for use at plant 48 of delivery point 26 and a centrate for providing the cap and tail for the coal slurry batch returned to the pipeline for movement to the next downstream delivery point.

The foregoing steps are repeated at each downstream delivery point. Finally, at the last downstream delivery point 32 (FIG. 1), the centrate will be dewatered and either used at the plant 48 of delivery point 32 or sold for use at other locations. In any case, the need for caps and tails material along the pipeline is satisfied by recovering the caps and tails for use in the portion of the pipeline from that portion of the coal slurry dewatered at each delivery point so that no grinding of caps and tails material or pseudo fluid is required at each downstream delivery point. This feature reduces pipeline operation costs and avoids the need for costly coal grinding equipment at each delivery point.

Figure 4:
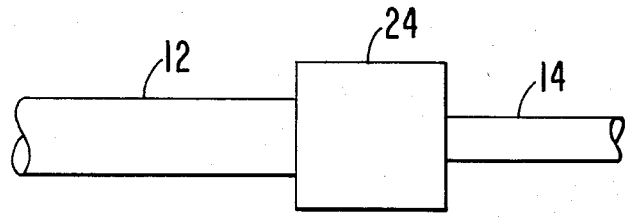
FIG. 4 is an enlarged, fragmentary view of a modified form of the pipeline showing the way in which the diameter of the pipeline can vary along its length.

FIG. 4 shows a portion of pipeline 10 when adjacent segments, such as segments 12 and 14, are of different diameters. The purpose of this variation in pipeline diameter on either side of a delivery point is to compensate for the reduction in volume of coal slurry caused by removing a portion of the coal slurry at the delivery point.

Figure 5:
FIG. 5 is a block diagram of a series of batches of coal slurry moveable through a pipeline.

Another aspect of the present invention is to permit the transport of several different types of solids as slurries along a pipeline system with several delivery points and interrupting the slurry flow at each delivery point along the pipeline as described above with respect to FIGS. 1 and 2. This concept is illustrated in schematic form in FIG. 5 wherein batches 52, 54 and 56 of slurries made from different types of solids are transported in a segregated fashion along a pipeline 10 between batches 58 and 60 of carrier fluid. A cap 62 of centrate as described above is placed between carrier fluid batch 58 and slurry batch 52. A cap 64 is placed between slurry batches 52 and 54, and a cap 66 is placed between slurry batches 54 and 56. A tail 68 is placed between a slurry slug 56 and a carrier fluid batch 60. At each of a plurality of downstream delivery points, the batches 52, 54 and 56 are pumped into separate holding tanks. A portion of the caps or cap and tail on opposite ends of each slurry batch is also pumped into each holding tank or to other tanks. A portion of the slurry from at least one of the holding tanks is removed therefrom and dewatered to form the cake and the centrate as described above with respect of FIG. 2. The cake is used at the delivery point, whereas the centrate provides the caps and tails for the remainder of the slurry batches when such batches are returned to the pipeline for transit in the segregated manner as shown in FIG. 5 to the next downstream delivery point. In this way, different types of solids can be kept separate in the pipeline yet a portion of one or all of the different types of solids can be used at each downstream delivery point and the remaining slurry batches can then be transported to the next succeeding downstream delivery point.

What is claimed is:

1. A method of transporting a slurry along a pipeline having a number of delivery points along its length with each delivery point having a holding zone, a dewatering zone and a centrate storage zone comprising: directing a batch of said slurry into the pipeline at an entry point and between a cap and a tail with the cap and tail being formed from a fluid suspension of solids as fines; forcing said batch of slurry and its cap and tail along the pipeline between a pair of batches of a carrier fluid to a selected delivery point; directing said batch of slurry and its cap and tail from the pipeline directly into the holding zone at said selected delivery point to form a mixture; moving a portion of the mixture directly to said dewatering zone; dewatering a part of the mixture of the removed batch of slurry and its cap and tail at said dewatering zone to form a cake and a centrate defined by a fluid suspension of solids as fines; moving the centrate directly into the centrate storage zone; returning a second part of the mixture directly to the pipeline at said selected delivery point to form a batch of slurry; shifting at least a portion of the centrate from said centrate storage zone directly to the pipeline to allow the centrate to be used as a cap and a tail with said second part of the mixture; and repeating the forcing, directing, dewatering, moving, returning and shifting steps at least at one of the other delivery points along said pipeline.

2. A method as set forth in claim 1, wherein the solids include coal.

3. A method as set forth in claim 2, wherein the coal is of at least two different types.

4. A method as set forth in claim 1, wherein the solids are at least two different types of minerals.

5. A method as set forth in claim 1, wherein the centrate is further dewatered to thicken the same before the centrate is returned to the pipeline as a cap and a tail.

6. A method as set forth in claim 1, wherein said first part is in the range of 5 to 80% of the volume of said second part.

7. A method as set forth in claim 1, wherein said cake contains in the range of 80 to 98% by weight of the solids present in the first part.

8. A method as set forth in claim 1, wherein said removing step includes directing the slurry batch and its cap and tail as a mixture into a holding region.

9. A method as set forth in claim 1, wherein said returning step includes pumping a first portion of the centrate into the pipeline to form a cap, pumping said second part into the pipeline behind the cap, and pumping a second portion of the centrate into the pipeline to form the tail.

10. A method as set forth in claim 9, wherein said returning step includes pumping a first batch of carrier fluid into the pipeline in advance of the cap, and pumping a second batch of carrier fluid into the pipeline immediately following the tail.

11. A method as set forth in claim 1, wherein is included the steps of grinding solids at said entry point into fines, and mixing said fines with a fluid to form said fluid suspension of fines.

12. A method as set forth in claim 1, wherein is included the step of grinding a slurry of the solids at said entry point to form said fluid suspension of fines.

13. A method as set forth in claim 1, wherein said directing step includes pumping a first batch of said carrier fluid in the pipeline in advance of the coal slurry batch and its cap, and pumping a second batch of said carrier fluid in the pipeline following the coal slurry batch and its tail.

14. A method as set forth in claim 1, wherein the fluid of said fluid suspension of solids is selected from the group including water, alcohols, hydrocarbons, ammonia and carbon dioxide.

15. A method as set forth in claim 1, wherein the fluid of said carrier fluids is selected from the group including water, alcohols, hydrocarbons, ammonia and carbon dioxide.

16. A method as set forth in claim 1, wherein is included the step of reducing the cross-section of the path of flow of said coal slurry batch as the batch moves from a first delivery point to a second delivery point.

17. A method as set forth in claim 1, wherein said coal slurry batch includes a pair of batch segments, there being a cap between the batch segments, said removing step including directing the batch segments into respective holding regions, said separating step including shifting a quantity of one of the batch segments out of its holding region.

18. A method as set forth in claim 17, wherein said returning step includes keeping the batch segments segregated from each other as the batch segments move through the pipeline.

19. Apparatus for transporting a slurry comprising: a pipeline having an entry point and a number of downstream delivery points; means at the entry point for directing a batch of slurry having a cap and tail into the pipeline with the cap and tail being formed from a fluid suspension of fines; a holding tank, and a dewatering unit and a centrate storage unit at each downstream delivery point, respectively; first means directly connecting the holding tank at each downstream delivery point to the pipeline to permit a slurry batch and its cap and tail to be directed from the pipeline into the holding tank to form a mixture in the holding tank; second means connecting each dewatering unit directly to a respective holding tank to permit a part of the mixture of the holding tank to be received by the dewatering unit and to be dewatered to form a solids cake and a centrate defined as a fluid suspension of fines; third means connecting said dewatering unit at the corresponding delivery point directly to the centrate storage unit, whereby the centrate can be transferred from the dewatering unit to the centrate storage unit; fourth means for connecting said holding tank directly to the pipeline at the corresponding delivery point to permit a slurry batch in the holding tank to be returned to the pipeline; and fifth means connecting the centrate storage unit directly with the pipeline at the corresponding delivery point, whereby a cap and a tail from said centrate storage unit can be directed into the pipeline ahead of and behind a slurry batch returned to the pipeline from the respective holding tank for transit to the next downstream delivery point.

20. Apparatus as set forth in claim 19, wherein each downstream delivery point has a plant for using the cake, the dewatering unit being connected to the plant to allow cake formed by the dewatering unit to be directed to said plant.

21. Apparatus as set forth in claim 20, wherein is included a source of carrier fluid at each downstream delivery point, respectively, said source being connected with said pipeline to permit a carrier fluid to be directed from the source into the pipeline ahead of and behind a coal slurry batch and its cap and tail.

22. Apparatus as set forth in claim 21, wherein is included a source of slurry, a source of carrier fluid, and a source of said fluid suspension of fines at said entry point, said sources being connected with said pipeline.

23. Apparatus as set forth in claim 19, wherein said holding tank includes a pair of holding tank sections for receiving batches of slurries of different types, said dewatering unit being connected with said holding tank sections.

24. Apparatus as set forth in claim 19, wherein the pipeline segment on one side of a downstream delivery point has a diameter different from the diameter of the pipeline segment on the other side of the downstream delivery point.

* * * * *